United States Patent
Lambourn et al.

(10) Patent No.: US 9,448,371 B2
(45) Date of Patent: *Sep. 20, 2016

(54) RFID-ENABLED OPTICAL ADAPTER FOR USE WITH A PATCH PANEL

(71) Applicants: Tyco Electronics UK LTD, Wiltshire (GB); Tyco Electronics Shanghai Co., LTD, Shanghai (CN); Tyco Electronics Raychem BVBA, Kessel-Lo (BE)

(72) Inventors: Stephen Lambourn, Wiltshire (GB); Ian Miles Standish, North Wales (GB); XingJun Cheng, Shanghai (CN); Christopher Charles Taylor, Cheltenham (GB); Erwin Junius, Tremelo (BE)

(73) Assignees: CommScope Connectivity UK Limited, London (GB); ADC Telecommunications (Shanghai) Distribution Co., Ltd., Shanghai (CN); CommScope Connectivity Belgium BVBA, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,523

(22) Filed: Apr. 22, 2015

(65) Prior Publication Data
US 2015/0226925 A1 Aug. 13, 2015

Related U.S. Application Data

(63) Continuation of application No. 13/939,830, filed on Jul. 11, 2013, now Pat. No. 9,052,472.

(60) Provisional application No. 61/670,357, filed on Jul. 11, 2012.

(51) Int. Cl.
*G02B 6/38* (2006.01)
*G06K 7/10* (2006.01)

(52) U.S. Cl.
CPC ........... *G02B 6/3895* (2013.01); *G02B 6/3825* (2013.01); *G02B 6/3897* (2013.01); *G06K 7/10336* (2013.01); *G06K 7/10415* (2013.01)

(58) Field of Classification Search
None
See application file for complete search history.

(56) References Cited

U.S. PATENT DOCUMENTS 8,207,906 B2   6/2012   Tiscareno et al.
9,052,472 B2 *  6/2015   Lambourn ........... G02B 6/3895
(Continued)

FOREIGN PATENT DOCUMENTS

CN   102201866   9/2011
CN   102340420   2/2012
CN   202815876   3/2013

OTHER PUBLICATIONS

Australian Patent Office, "Office Action for Australian Patent Application No. 2013288772", "from Foreign Counterpart to U.S. Appl. No. 13/939,830", May 1, 2015, pp. 1-2, Published in: AU.

(Continued)

*Primary Examiner* — Sung Pak
(74) *Attorney, Agent, or Firm* — Fogg & Powers LLC

(57) ABSTRACT

One embodiment is directed to a system comprising a panel comprising a plurality of openings. The system is configured to selectively couple a panel contact for each opening to an RFID reader. The system further comprises a plurality of optical adapters. Each optical adapter comprises: at least one radio frequency identifier (RFID) antenna; at least one adapter contact that is electrically connected to the RFID antenna; and at least one conductor configured to electrically connect the adapter contact to respective one of respective panel contacts when the optical adapter is inserted into one of the openings of the panel. The RFID antenna of each connector is configured to be positioned near an RFID tag attached to the connector when the connector is inserted into the body of the optical adapter. The system is configured to selectively couple the RFID reader to each of the panel contacts. Other embodiments are disclosed.

39 Claims, 15 Drawing Sheets

(56) References Cited

U.S. PATENT DOCUMENTS

| | | |
|---|---|---|
| 2005/0215119 A1 | 9/2005 | Kaneko |
| 2006/0263011 A1 | 11/2006 | Chen |
| 2009/0175580 A1 | 7/2009 | Chen et al. |
| 2010/0079248 A1 | 4/2010 | Greveling |
| 2011/0274437 A1 | 11/2011 | Jones et al. |
| 2012/0007717 A1 | 1/2012 | Jong |
| 2012/0033979 A1 | 2/2012 | Priyadarshi |
| 2014/0016901 A1 | 1/2014 | Lambourn et al. |
| 2014/0016902 A1 | 1/2014 | Pepe et al. |
| 2014/0029934 A1 | 1/2014 | Xia et al. |
| 2014/0141649 A1 | 5/2014 | Standish et al. |
| 2014/0321810 A1 | 10/2014 | Leigh et al. |

OTHER PUBLICATIONS

Patent Cooperation Treaty, "International Search Report from PCT Application No. PCT/EP2013/064670 mailed Sep. 26, 2013", "from Foreign Counterpart of U.S. Appl. No. 13/939,830", Sep. 26, 2013, pp. 1-3, Published in: WO.

Chinese Patent Office, "First Office Action for CN Application No. 201380036890.5", "from Foreign Counterpart to U.S. Appl. No. 13/939,830", Oct. 27, 2015, pp. 1-13, Published in: CN.

European Patent Office, "Communication under Rule 71(3) for EP Application No. 13739958.0", "from Foreign Counterpart to U.S. Appl. No. 14/693,523", Jan. 8, 2016, pp. 1-52, Published in: EP.

Australian Patent Office, Notice of Acceptance for AU Application No. 2013288772, from Foreign counterpart to U.S. Appl. No. 13/939,830, Apr. 18, 2016, pp. 1-3, Published in: AU.

Chinese Patent Office, Notification to Grant Patent Right for CN Application No. 201380039890.5, from Foreign Counterpart to U.S. Appl. No. 13/939,830, Mar. 29, 2016, pp. 1-7, Published in: CN.

Chile Patent Office, Office Action for CL Application No. 3502-14, from U.S. Appl. No. 13/939,830, Jul. 6, 2016, pp. 1-11, Published in: CL.

* cited by examiner

RFID-ENABLED OPTICAL ADAPTER FOR
USE WITH A PATCH PANEL

CROSS-REFERENCE TO RELATED
APPLICATION

This application is a continuation application of U.S. patent application Ser. No. 13/939,830, filed Jul. 11, 2013, which claims the benefit of U.S. Provisional Patent Application Ser. No. 61/670,357, filed on Jul. 11, 2012, both of which are hereby incorporated herein by reference.

BACKGROUND

Patching or other interconnect systems are commonly used in communication networks in order to provide flexibility in implementing logical communication links. One example of a patching or interconnect system is a patch panel. A patch panel typically includes a panel in which a plurality of ports are formed or otherwise housed. Each port includes a "front" connector (or other attachment mechanism) and a "rear" connector (or other attachment mechanism such as a punch-down block or permanently attached optical fiber). The port is configured to communicatively couple any cable attached to the front connector of that port to any cable that is attached to the rear of that port. Other patching systems are implemented in similar ways.

Many types of physical layer management (PLM) systems have been developed in order to automatically keep track of which cables are attached to which ports of a patching system. In one type of system, each connector that is attached to a front connector of a patch panel has a radio frequency identification (RFID) tag attached to it. An RFID reader can then be used to wirelessly read an identifier from each front connector's RFID tag in order to keep track of what connectors and cables are attached to the front connectors of the patch panel. Typically, an RFID reader is integrated into the patch panel in order to read such front RFID tags. However, such systems do not include any mechanism to automatically track the rear connectors or cables. Also, with such systems, the connectors used to implement the ports themselves are typically not removable.

SUMMARY

One embodiment is directed to an optical adapter comprising a body in which at least one connector can be inserted, at least one radio frequency identification (RFID) antenna, and a visual indicator. The optical adapter further comprises at least one adapter contact that is electrically connected to the RFID antenna and the visual indicator and a clip configured to electrically connect the adapter contact to a panel contact on a panel when the optical adapter is inserted into the panel and to mechanically hold the optical adapter in the panel. The RFID antenna is configured to be positioned near an RFID tag attached to the connector when the connector is inserted into the body of the optical adapter.

Another embodiment is directed to a system comprising a panel comprising a plurality of openings, each of the opening comprising a respective panel contact, wherein the system is configured to selectively couple each panel contact to an RFID reader. The system further comprises a plurality of optical adapters configured to be inserted into the openings of the panel. Each optical adapter comprises a body in which at least one connector can be inserted, at least one radio frequency identification (RFID) antenna, and a visual indicator. Each optical adapter further comprises at least one adapter contact that is electrically connected to the RFID antenna and the visual indicator and a clip configured to electrically connect the adapter contact to respective one of respective panel contacts when the optical adapter is inserted into one of the openings of the panel and to mechanically hold the optical adapter in the panel. The RFID antenna of each connector is configured to be positioned near an RFID tag attached to the connector when the connector is inserted into the body of the optical adapter. The system is configured to selective couple the RFID reader to each of the panel contacts.

Another embodiment is directed to a method comprising inserting an optical adapter into an opening of a panel. The optical adapter comprises a body in which at least one connector can be inserted, at least one radio frequency identification (RFID) antenna, a visual indicator. The optical adapter further comprises at least one adapter contact that is electrically connected to the RFID antenna and the visual indicator and a clip configured to electrically connect the adapter contact to a panel contact on a panel when the optical adapter is inserted into the panel and to mechanically hold the optical adapter in the panel. The RFID antenna is configured to be positioned near an RFID tag attached to the connector when the connector is inserted into the body of the optical adapter. The method further comprises selectively coupling an RFID reader to the RFID antenna and reading a first RFID tag associated with a first connecter inserted into a first side of the optical adapter and reading a second RFID tag associated with a second connector inserted into a second side of the optical adapter.

DRAWINGS

Like reference numbers and designations in the various drawings indicate like elements. The drawings are not necessarily drawn to scale.

DETAILED DESCRIPTION

Figure 1A:
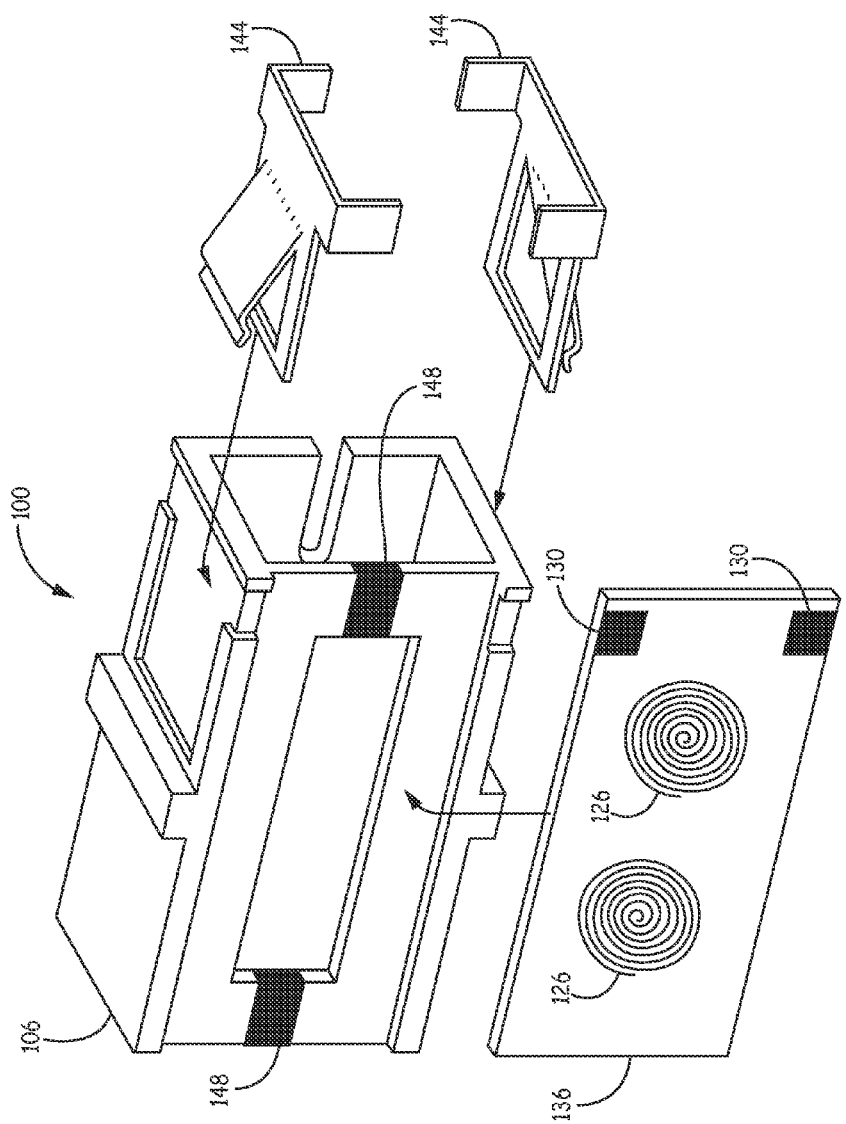
FIG. 1A shows one exemplary embodiment of an optical adapter in which a connector having a radio frequency identification (RFID) tag attached to it can be inserted.
Figure 1B:
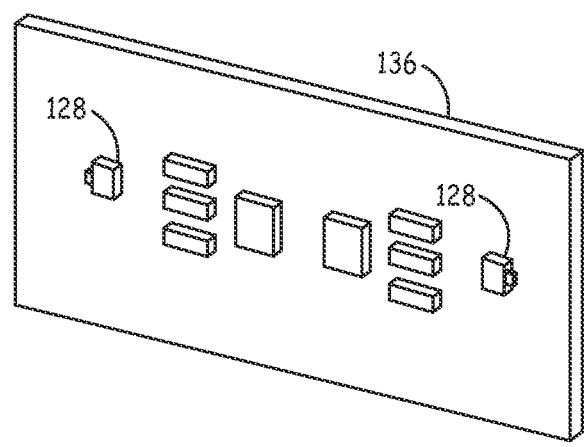
FIG. 1B shows the reverse side of the adapter printed circuit board of FIG. 1A.

FIGS. 1A-1E show one exemplary embodiment of an optical adapter 100 in which a connector 108 having a radio frequency identification (RFID) tag 102 attached to it can be inserted. In this exemplary embodiment, the optical adapter 100 can be used with an optical patch panel system (or other patching or other interconnect system) 104 (shown in FIG. 1F).

In general, the optical adapter 100 comprises a body 106 that has openings formed in opposing ends. The body 106 is configured to receive and mechanically hold two optical connectors 108 that terminate respective optical cables 110. The body 106 is configured, in a conventional manner, to optically couple a respective fiber 112 included in each of the cables 110 while the connectors 108 are fully inserted into the body 106 of the adapter 100.

Figure 1C:
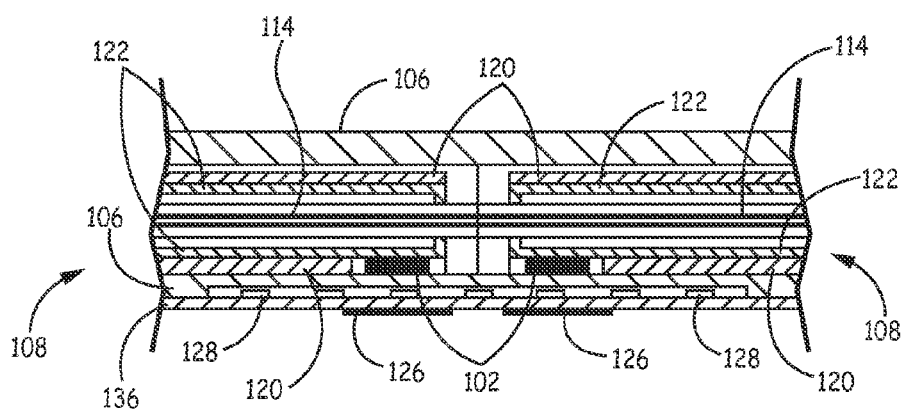
FIG. 1C shows a simplified top, cross sectional view of the optical adapter shown in FIG. 1A.
Figure 1D:
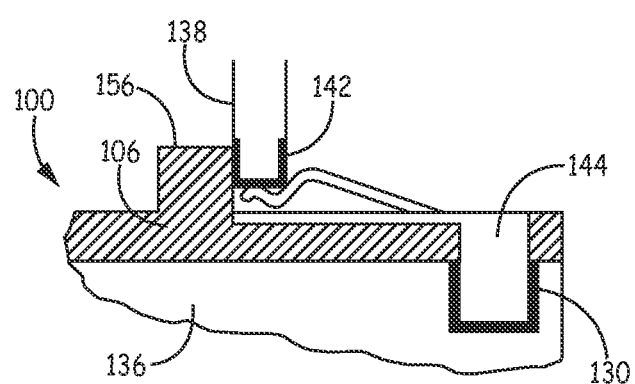
FIG. 1D shows a partial view of the optical adapter of FIG. 1A inserted into a panel printed circuit board of a patch panel system shown in FIG. 1F.
Figure 1E:
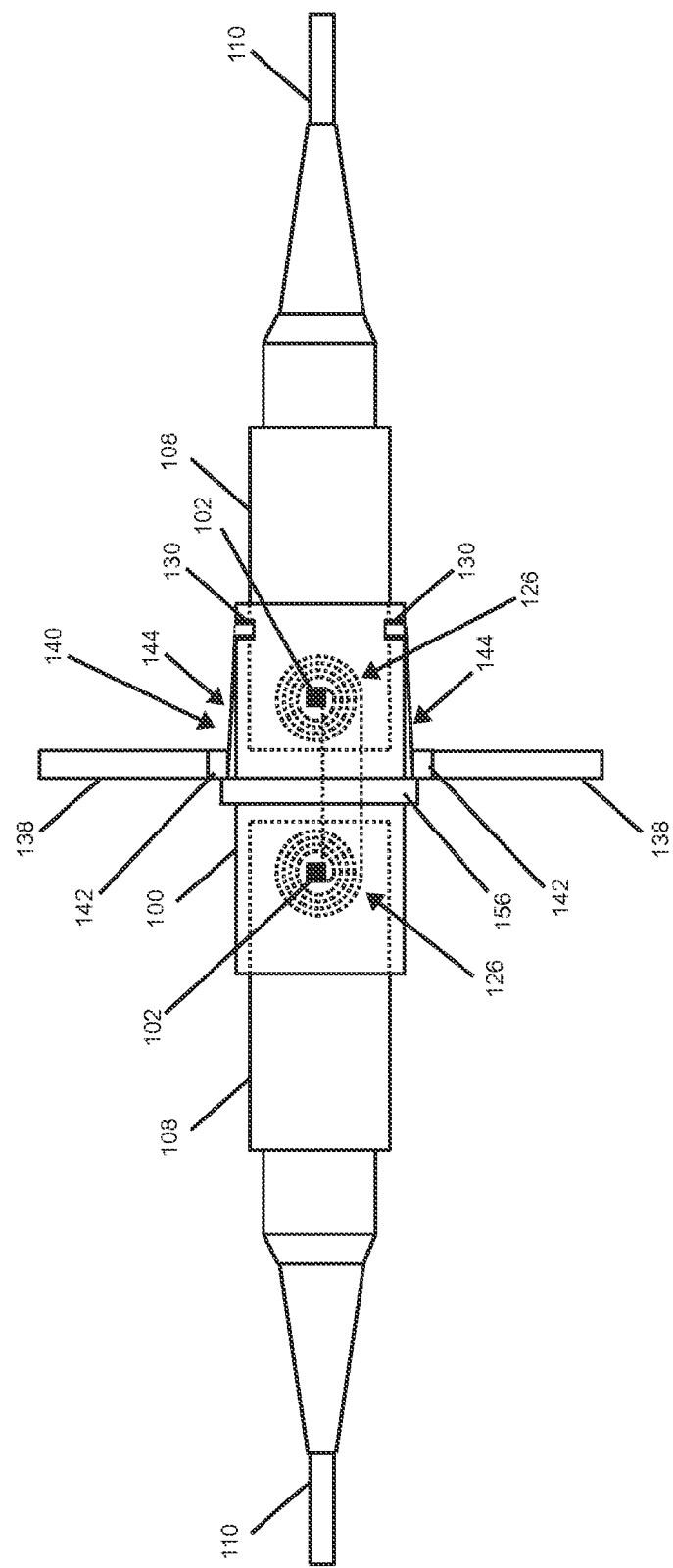
FIG. 1E shows two connectors inserted into the optical adapter of FIG. 1A.
Figure 1F:
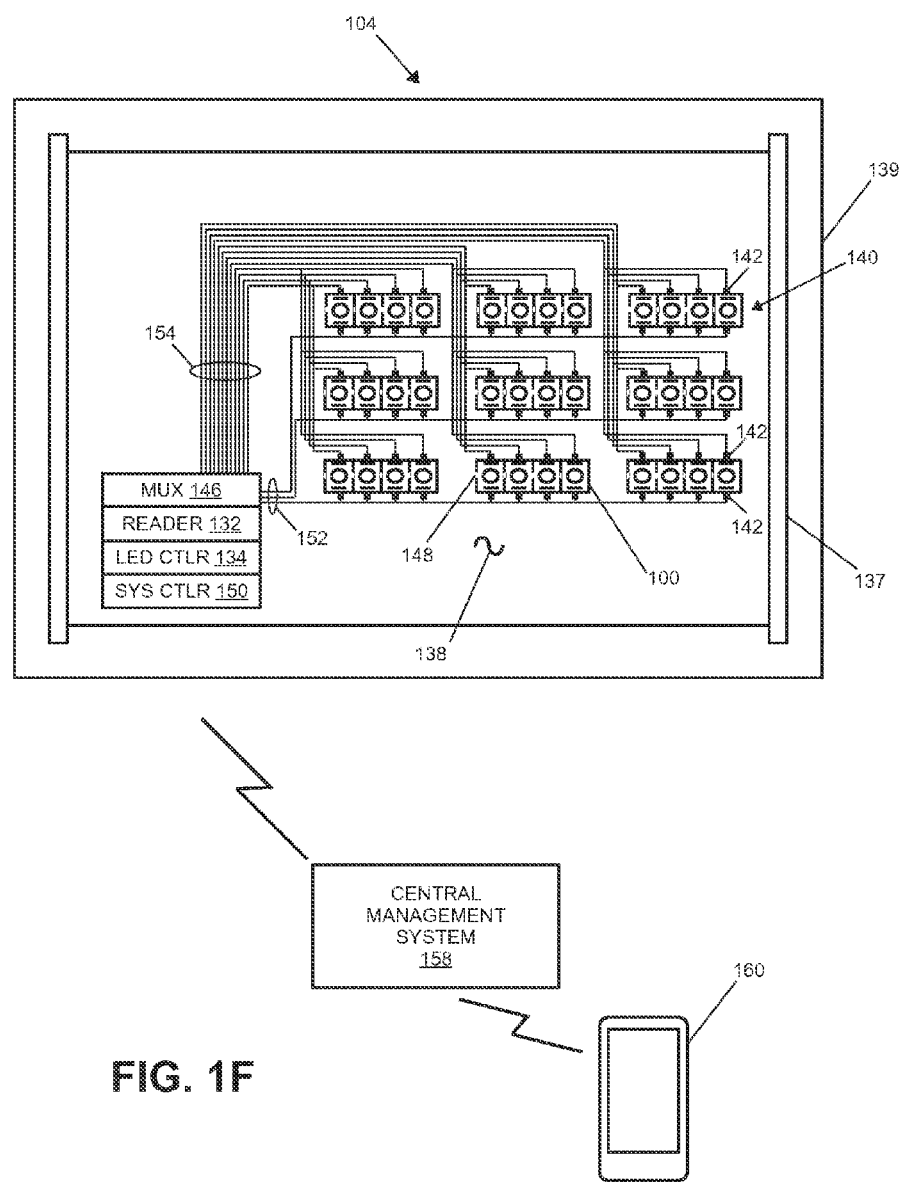
FIG. 1F shows one exemplary embodiment of an optical patch panel system in which the optical adapter of FIG. 1A can be used.

In the exemplary embodiment shown in FIGS. 1A-1F, the optical adapter 100 is implemented as a simplex SC adapter that is configured to mechanically hold, and optically couple to one another, two SC connectors 108 that terminate respective optical cables 110. As shown in FIG. 1C, in this exemplary embodiment, each connector 108 contains a respective ferrule 114 surrounding an end of the fiber 112 terminated by that connector 108. The ferrule 114 is axially positioned in a chamber 116 for each connector 108 and is biased by a spring (not shown). An RFID tag 102 is attached to each connector 108 by forming an opening 118 in an outer part 120 of the chamber 116 and attaching the RFID tag 102 to the inner part 122 of the chamber 116. This enables the inner part 122 to move in its normal way and not interfere with the normal operation of the connector 108. Otherwise, the connector 108 is implemented in a conventional manner.

In this exemplary embodiment, as shown in FIG. 1C, the body 106 of the optical adapter 100 includes a sleeve 124 to receive and align the ferrules 114 of two optical connectors 108 inserted into the optical adapter 100. This aspect of the adapter 100 is also implemented in a conventional manner.

The optical adapter 100 includes an RFID antenna 126 and visual indicator 128 attached to it. More specifically, in this exemplary embodiment, the RFID antenna 126 is implemented as a pair of RFID antenna coils 126 and the visual indicator 128 is implemented as a pair of light emitting diodes (LEDs) 128. The pair of RFID antenna coils 126 comprises a common loop (shown in FIG. 1E) that is coupled to a pair of contacts 130 that are also included in the optical adapter 100. Also, both LEDs 128 are connected to the same pair of contacts 130 that the coils 126 are coupled to. The pair of contacts 130 is used to selectively electrically connect the pair of coils 126 to an RFID reader 132 associated with the patch panel system 104 when the optical adapter 100 is inserted into the patch panel system 104. Also, the pair of contacts 130 is used to selectively electrically connect the pair of LEDs 128 to an LED controller 134 that is configured to turn the LEDs 128 on and off (for example, to provide a visual indication to a technician).

In the exemplary embodiment shown in FIGS. 1A-1F, the antenna coils 126 and LEDs 128 are attached to a printed circuit board (PCB) 136 that is attached to the outer surface of one side of the body 106 of the adapter 100. This PCB 136 is also referred to here as the "adapter" PCB 136. In this exemplary embodiment, the contacts 130 are implemented as conductive pads 130 located on an upper and lower part of the adapter PCB 136. The antenna coils 126 and LEDs 128 are electrically coupled to the adapter pads 130 by a circuit formed on the adapter PCB 136.

When fitted into the adapter 100 in its normal working position, the center of the RFID tag 102 of an inserted connector 108 and the center of one of the coils 126 on the adapter PCB 136 will align with one another (as shown in FIG. 1E)

The adapter 100 is configured to be inserted into a printed circuit board (PCB) 138 that can be attached to or form a part of the patch panel system 104. This PCB 138 is also referred to here as the "panel" PCB 138. The panel PCB 138 is supported by a rack 137 or other support structure (for example, a support structure that is integrated into an enclosure 139 that houses the components of the patch panel system 104).

The panel PCB 138 includes openings 140 into which a respective adapter 100 is inserted. These openings 140 are also referred to here as the ports 140 of the patch panel system 104. The panel PCB 138 includes edge-plated pads 142 on the top and bottom of each opening 140. The pads 142 are also referred to here as "panel pads" 142. The panel pads 142 are used to provide two connections between the panel PCB 138 and the adapter PCB 136 of the adapter 100 that is inserted into that opening 140. This is done using two clips 144. The clips 144 are configured to mechanically hold the corresponding adapter 100 in the opening 140 when it is inserted into the opening 140. One clip 144 is used on the top of the adapter 100, and the other clip 144 is used on the bottom of the adapter 100.

Each clip 144 is also configured to make an electrical connection between the panel pads 142 on the panel PCB 138 and the adapter pads 130 on the adapter PCB 136. The clips 144 can be formed, for example, out of metal or a plastic with metal inserts. The clips 144 can be formed in other ways. Each of the panel pads 142 on the panel PCB 138 is configured to come into contact with the spring part of one of the clips 144 when the adapter 100 is inserted into an opening 140 in the panel PCB 138. This results in two signal paths between each adapter PCB 136 and the panel PCB 138. In this exemplary embodiment, the other part of each clip 144 has a 90-degree fold so that this part lines up with and makes an electrical connection to a pad adapter 130 on the adapter PCB 136, by way of spring pressure or other connection measures.

As described below, a multiplexer 146 can be used to selectively couple the panel pads 142 associated with a particular port 140 of the patch panel system 104 to the RFID reader 132 in order to read the RFID tags 102 on the connectors 108 inserted into the corresponding adapter 100 and to the controller 134 in order to provide a visual indication using the LEDs (or other visual indicators) 128.

The antenna coils 126 can be formed on the outer or inner surface of adapter PCB 136 (using either discrete components or shaped tracking on the PCB) or formed in the adapter PCB 136. In this exemplary embodiment, the adapter pads 130 on the adapter PCB 136 are formed on the outer surface of adapter PCB 136, and the discrete electronic components and circuit are disposed on the other side of the adapter PCB 136 (opposite the coils 126) and/or embedded in the body 106 of the adapter 100 or the adapter PCB 136. The components and circuit include the LEDs (or other visual indicators) 128, which align with a light guide material 148 positioned either on the adapter PCB 136 or molded into the adapter body 106 or adapter PCB 136 for visual indication. The optical adapter 100 is configured to optically couple the light guide material 148 to the LEDs 128 so as to provide a visual indication at points that are remote from the LEDs 128.

The adapter PCB 136 can be attached to the side of the adapter 100 in a recess, clipped into the adapter body 106, molded into the adapter body 106 or using some other form of fitting. The components can also be encapsulated, especially if the adapter PCB 136 is molded into the adapter body 106 or for environmental reasons. Alternately, the components can be positioned internally in the adapter PCB 136 using various assembly or manufacturing techniques.

The antenna coils 126 for multiple adapters 100 and ports 140 are communicatively coupled to a single RFID reader 132 that is mounted to the panel PCB 138. Also, LEDs 128 for multiple adapters 100 and ports 140 are communicatively coupled to a single LED controller 134 that is mounted to the panel 138. The LED controller 134 is configured to turn the LEDs 128 on and off (for example, to provide a visual indication to a technician in connection with the technician carrying out an electronic work order). More specifically, in the exemplary embodiment shown in FIGS. 1A-1F, the pickup coils 126 for all of the adapters 100 and ports 140 are coupled to the same RFID reader 132, and the LEDs 128 for all of the adapters 100 and ports 140 are coupled to the same LED controller 134. However, in other exemplary embodiments, more than one RFID reader and LED controller can be used, where multiple adapters 100 and ports 140 are communicatively coupled to each RFID reader and each LED controller.

In the exemplary embodiment shown in FIGS. 1A-1F, a multiplexer 146 mounted to the panel PCB 138 is used to selectively couple the RFID reader 132 and the LED controller 134 to the adapter PCB 136 for one of the adapters 100 inserted into the panel 104. Also, a system controller 150 is mounted to the panel PCB 138 and is communicatively coupled to the RFID reader 132 and the LED controller 134.

The circuit on each adapter PCB 136 is coupled to the multiplexer 146 using a respective two lines that are used both for coupling the antenna coils 126 for that adapter PCB 136 to the RFID reader 132 and for coupling the LEDs 128 for that adapter PCB 136 to the LED controller 134.

In this example, the LED controller 134 controls the LEDs 128 using direct current (DC) signals, whereas the RFID reader 132 interrogates RFID tags 102 inserted into that adapter 100 (via the pickup coils 126) using radio frequency (RF) alternating current (AC) signals. The circuit on each adapter PCB 136 includes appropriate filter components that isolate the DC signals used for controlling the LEDs 128 and the RF AC signals used for interrogating RFID tags 102 from one another.

An X-Y array is used to selectively couple the multiplexer 146 to the adapter PCB 136 of one of the adapters 100. In this example, all of the adapters 100 in each row of the panel 104 share a common "row" line 152 that is connected to a respective row I/O terminal of the multiplexer 146. Also, all of the adapters 100 in each column of the panel 104 share a common "column" line 154 that is connected to a respective column I/O terminal of the multiplexer 146. Under the control of the system controller 150, the multiplexer 146 is able select one of the adapters 100 by coupling one of its row I/O terminals (and the corresponding row line 152 connected to it) and one of its column I/O terminals (and the corresponding column line 154 connected to it) to the RFID reader 132 and the LED controller 134. This causes the adapter PCB 136 of the adapter 100 located at the selected row and column to be coupled to the RFID reader 132 and the LED controller 134. The number of control lines in the patch panel system 104 is greatly reduced by using the same lines in the X-Y array for coupling the antenna coils 126 to the RFID reader 132 and for coupling the LEDs 128 to the LED controller 134.

As shown in FIG. 1E, in this exemplary embodiment, the panel pads 142 for each port 140 are formed on the panel PCB 138 on the top and bottom of the corresponding opening 140. For each port 140, one of the pads 142 terminates the row line 152 for that port 140 and the other of the pads 142 terminates the column line 154 for that port 140.

In the example shown in FIGS. 1A-1F, the body 106 of each adapter 100 has a middle ridge 156 that, when the adapter 100 is inserted into an opening 140 in the panel PCB 138, comes into contact with the face of the panel PCB 138 and prevents the adapter 100 from sliding through the opening 140.

In exemplary embodiment, the lines 152 and 154 are formed on or in the panel PCB 138. For ease of illustration, the lines 152 and 154 are visible in FIG. 1F. However, in one implementation, the panel PCB 138 is formed to appear as a conventional metal panel used in conventional patch panels by painting (or otherwise covering) the panel PCB 138 (and the lines 152 and 154 formed therein or thereon) with a color of the type used on conventional metal panels.

Each RFID tag 102 stores a unique identifier for the associated connector 108 or and/or cable 110. This identifier can be used to identify which cable 110 is attached to each port 140 of the patch panel 104. In some implementations, the RFID tags 102 are used to store other information and/or are written to as well as read from. Typically, each RFID tag 102 includes a non-volatile memory that is used to store such information and RFID transponder electronics to enable the RFID tag 102 to be energized by, and communicate with, the RFID reader 132.

The information that is read from the RFID tags 102 can then be used for various PLM-related purposes. For example, the information read from the RFID tags 102 can be communicated to a central management system 158 that tracks which cables are attached to the patch panel 104. Information read from the RFID tags 102 can be communicated to the management system 158 in various ways (for example, using a wireless network connection, wired network connection, or removable media).

Also, the information read from RFID tags 102 can be used in assisting a technician in carrying out a work order that, for example, involves moving, adding, or otherwise changing a connection that is made at the patch panel system 104. For example, information about a work order that is to be carried can be downloaded to a mobile communication device 160. Software executing on the mobile communication device 160 can then provide a technician using the mobile communication device 160 with step-by-step directions for performing the work order. Information that is read from the RFID tags 102 can be used by the mobile communication device 160 and/or the central management system 158 to assist the technician in performing the work order. Information read from the RFID tags 102 can be used to identify a particular connector 108 that is to be affected by a step of a work order. Also, information read from an RFID tag 102 after a step of a work order has been performed can be used to confirm that the step was properly carried out.

The information read from the RFID tags 102 can be used for other purposes as well.

Also, in this exemplary embodiment, the antenna coils 126 are implemented as a single, common loop (shown in FIG. 1). When the RFID reader 132 is selectively coupled to the antenna coils 126 for a particular port 140 on the patch panel system 104 via the multiplexer 146, the RFID reader 132 is able to read an RFID tag 102 that is attached to both connectors 108 (that is, front and rear) that are inserted into the adapter 100 or any RFID tag 102 that is attached to a protective cap that is inserted into the adapter 100.

To do this, the RFID reader 132 broadcasts a radio frequency (RF) signal that is suitable to energize any RFID tags 102 attached to any connectors 108 or protective cap inserted into the targeted adapter 100 and, in response, cause the RFID tags 102 (if any) to transmit at least some of the information stored in them. One way to do this uses the standard RFID anti-collision protocols that standard RFID tags implement to address situations where multiple RFID tags attempt to transmits at the same time.

With this approach, in order to read RFID tags 102 attached to both connectors 108 attached to a given adapter 100, the RFID reader 132 is configured to broadcast the RF interrogation signal and wait until responsive transmissions are received from RFID tags 102 associated with both sides of the adapter 100 or until a timeout period has elapsed. With this approach, the timeout period that the RFID reader 132 waits to receive transmissions should be sufficiently long to allow RFID tags 102 from both sides of the adapter 100 to transmit their information in the situation where the worst-case delay is incurred using the standard RFID anti-collision protocol. Also, the RFID reader 132 is configured to wait before providing any signal to the technician that the read transaction is complete.

One issue with this approach is that the standard RFID anti-collision protocols may result in such read transactions taking too long.

Another approach makes use of the application family identifier (AFI) defined by the ISO RFID standards. In general, when the AFI is used, the RFID tags are configured to respond only to only a particular type of RFID interrogation signal (that is, an RFID interrogation signal that includes an AFI byte with a particular value). This is done to read multiple RFID tags 102 in a way that can be faster than simply using the standard RFID anti-collision protocol.

For example, three different AFI values can be used. A first AFI value can be assigned to RFID tags 102 that are attached to connectors 108 that are inserted into the rear side of the patch panel system 104, a second AFI value can be assigned to RFID tags 102 that are attached to connectors 108 that are inserted into the front side of the patch panel system 104, and a third AFI value can be assigned to RFID tags 102 that are attached to protective caps that are inserted into the front side of the patch panel system 104. If an RFID tag 102 attached to the protective cap is read (which is determined by the AFI value), that indicates that the front side of the associated adapter 100 is unused. That is, if the front side of an adapter 100 has a protective cap in it (which is determined by reading the RFID tag 102 attached to the protective cap), the front side of that adapter 100 is considered to be unused.

In the exemplary embodiment described above in connection with FIGS. 1A-1F, SC adapters and connectors are used. However, it is to be understood that other types of connector and adapter types can be used (LC, FC, LX.5, MTP, or MPO adapters and connectors).

In this exemplary embodiment, the optical adapter 100 is configured to be removable and re-insertable into the patch panel system 104. Also, in this exemplary embodiment, the optical adapter 100 and the pair of antenna coils 126 are configured to read an RFID tag 102 attached to a connector 108 inserted into a first (for example, front) side of the optical adapter 100 and to read an RFID tag 102 attached to a connector 108 inserted into a second (for example, rear) side of the optical adapter 100.

Figure 2A:
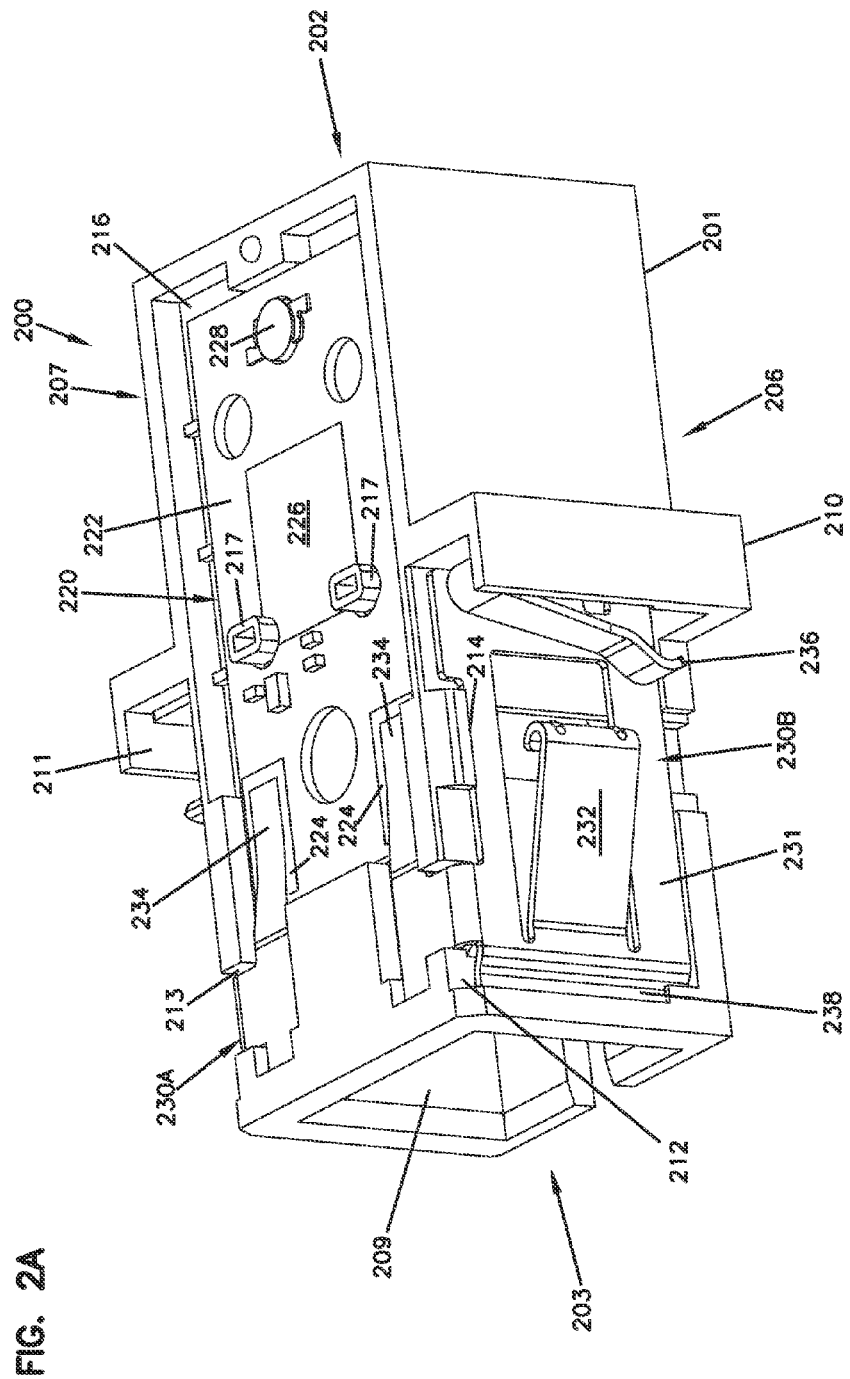
FIG. 2A shows another exemplary embodiment of an optical adapter.
Figure 2B:
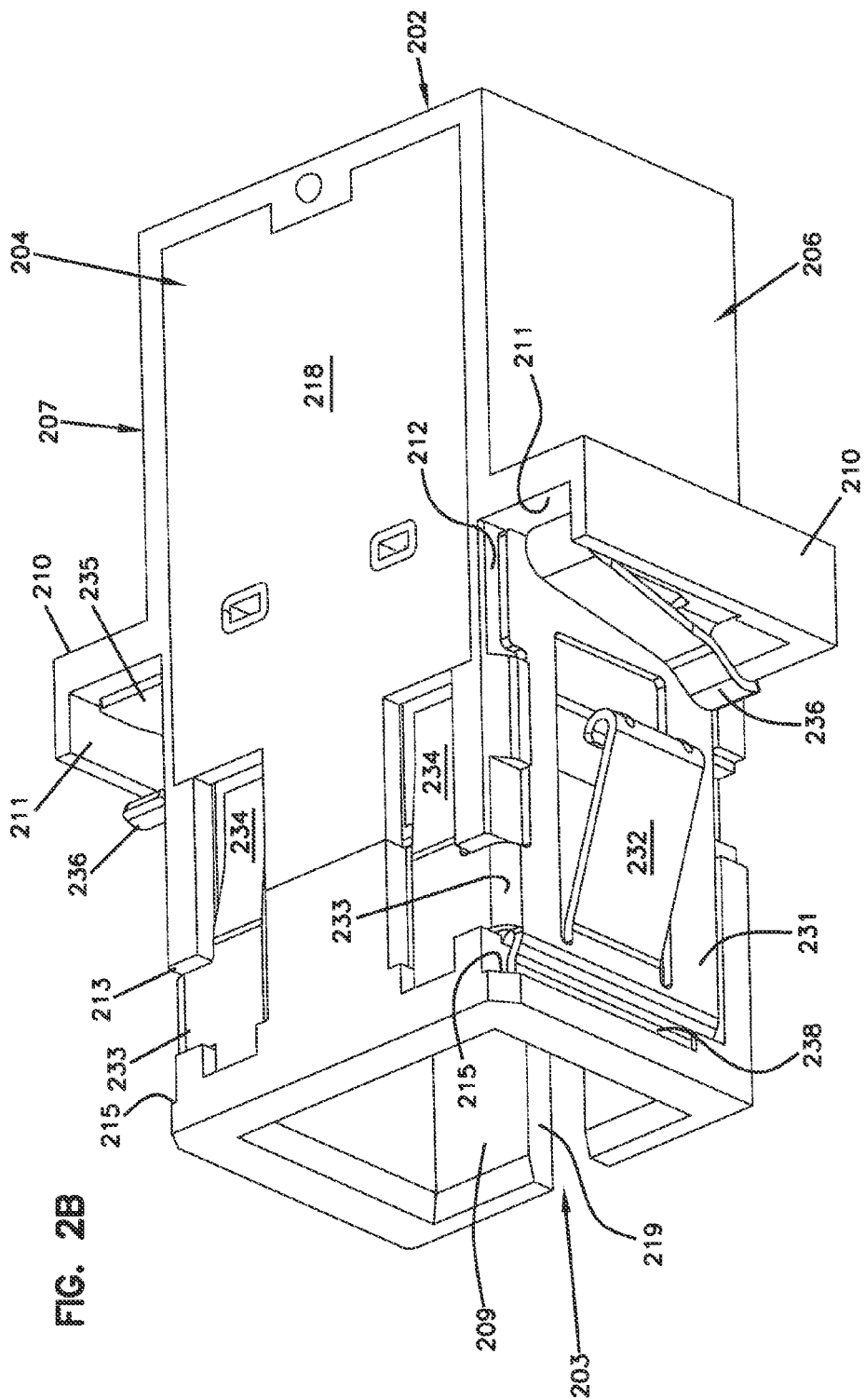
FIG. 2B shows the optical adapter of FIG. 2A with a circuit board attached to the optical adapter.
Figure 2C:
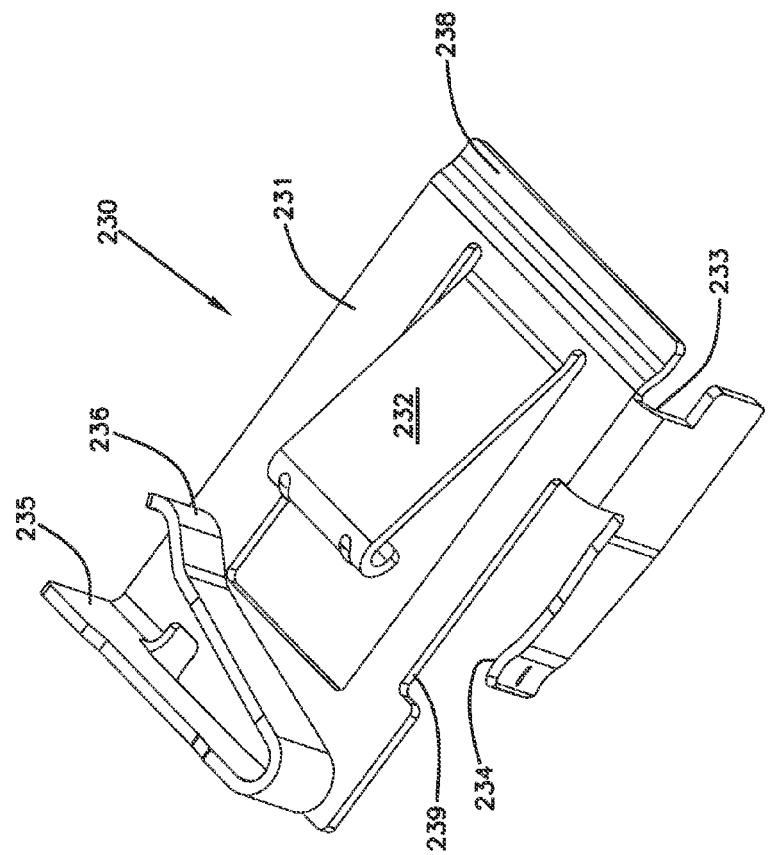
FIG. 2C shows an example of a clip that is suitable for use with the optical adapter of FIG. 2A.
Figure 2D:
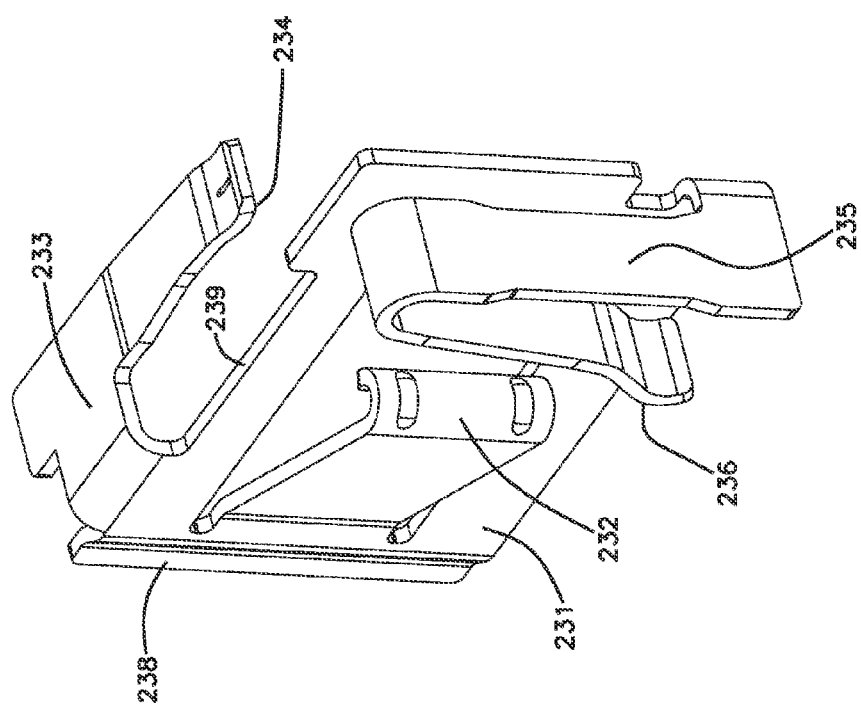
FIG. 2D shows a rotated view of the clip of FIG. 2C.
Figure 2E:
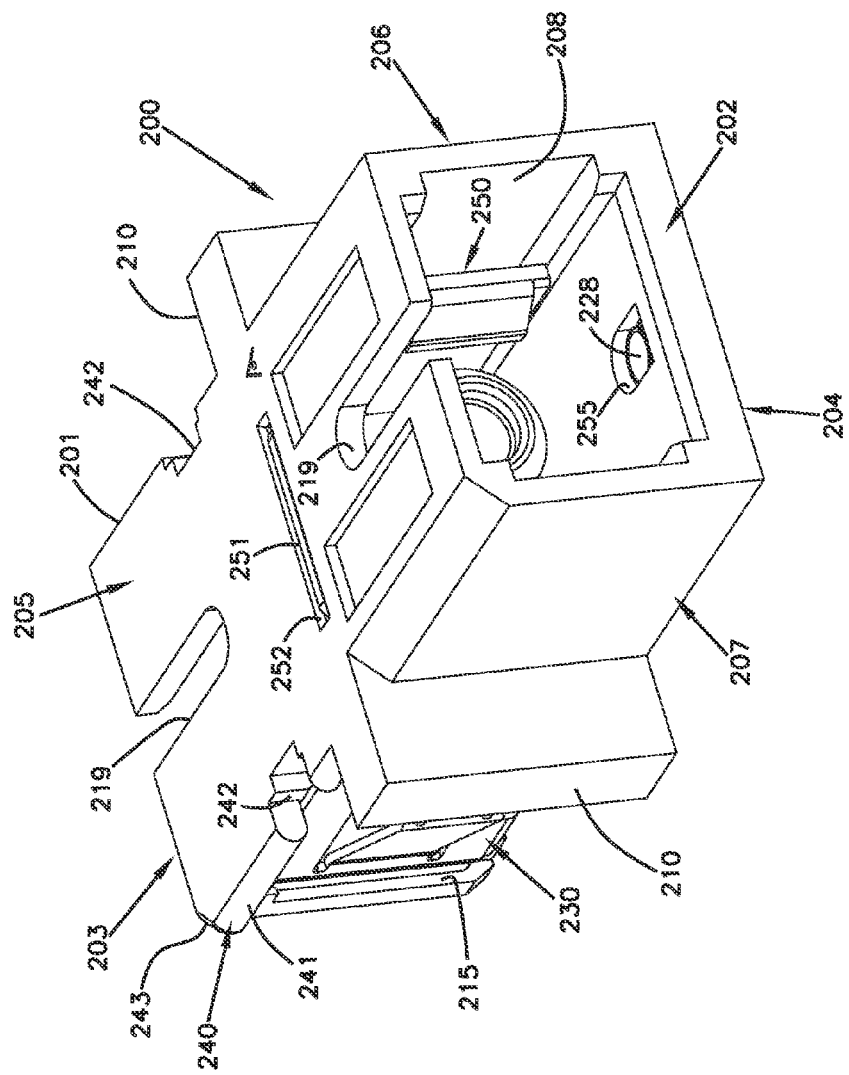
FIGS. 2E-2G shows the opposite side of the optical adapter of FIG. 2A.

FIG. 2A illustrates an example optical adapter 200 including an adapter body 201 having parallel sides 204, 205 and parallel ends 206, 207 that extend between a front 202 and a rear 203 (see FIGS. 2B and 2E). In certain implementations, the sides 203, 204 form major surfaces of the adapter body 201 and the ends 206, 207 form minor surfaces of the adapter body 201. The adapter body 201 defines a first opening 208 at the front 202 and a second opening 209 at the rear 203. Each opening 208, 209 is configured to receive an optical plug connector. The openings 208 and 209 are also referred to here as "plug openings" 208 and 209.

A plug retention arrangement 250 is mounted within the adapter body 201 to hold the plug connectors in the plug openings 208, 209. For example, the plug retention arrangement 250 can include resilient fingers that latch onto outer bodies of the plug connectors. In certain implementations, the plug retention arrangement 250 is configured to receive and align ferrules of the plug connectors. In an example, the plug retention arrangement 250 includes a flange 251 configured to be held within a slot 252 defined in the adapter body 201 to secure the plug retention arrangement 250 to the adapter 200 (see FIG. 2E).

An example circuit arrangement 220 is disposed on a first side 204 of the adapter body 201. For example, the first side 204 of the adapter body 201 can define a recess 216 sized to hold a circuit board 222. The adapter body 201 includes one or more pegs 217 that extend outwardly from the recess 216. The circuit board 222 defines one or more openings 225 sized to receive the pegs 217. Accordingly, the pegs 217 aid in aligning the circuit board 222 on the adapter body 201 and in holding the circuit board 222 to the adapter body 201.

The circuit board 222 includes two contact pads 224 at one end of the circuit board 222. At least one RFID antenna coil 226 also is mounted to the circuit board 222. For example, the RFID antenna coil 226 can be mounted at a central region of the circuit board 222. In certain implementations, a visual indicator 228 (for example, a light source such as a light emitting diode) is mounted to the circuit board 222. For example, the visual indicator 228 can be mounted to an opposite end of the circuit board 222 from the contact pads 224. In the particular example shown in FIGS. 2A-2I, the visual indicator 228 is implemented using an LED 228, and the visual indicator 228 is also referred to here as the "LED 228". In one example, the RFID antenna coil 226 is positioned between the contact pads 224 and the LED 228. The adapter body 201 defines an opening 255 (FIG. 2E) accessible from an interior of the first plug opening 208. The LED 228 is disposed at the opening 255 so that light emitted from the LED 228 enters the first plug opening 208. Accordingly, the LED 228 can illuminate any light transmissible material disposed at the plug opening 208 (for example, on a plug connector received at the plug opening 208).

In some implementations, a cover 218 is disposed over the circuit board 222 (for example, see FIG. 2B). For example, the cover 218 can be overmolded to the adapter body 201 over the circuit board 222. In other implementations, the cover 218 can be latched, welded, or otherwise secured to the adapter body 201. The cover 218 inhibits damage to the circuit board 222 and components mounted thereto. In certain implementations, the cover 218 includes cutouts or recesses that align with the contact pads 224 that enable the contact pads 224 to remain uncovered. In other implementations, the cover 218 ends before reaching the pads 224.

The adapter body 201 includes bulkhead flanges 210 that extend outwardly from the ends 206, 207 of the adapter body 201. For example, the bulkhead flanges 210 can extend outwardly from intermediate sections of the ends 206, 207. The bulkhead flanges 210 facilitate holding the adapter body 201 to a panel 300 or other surface (see FIG. 2H). For example, one or more clips 230 can be disposed on the adapter body 201. Each clip 230 includes a clip body 231 configured to mount to the adapter body 201. In some implementations, a majority of the clip body 231 extends over one of the ends 206, 207 of the adapter body 201.

The clip body 231 has at least a first contact section 232 that resiliently extends outwardly from the adapter body 201 when the clip body 231 is mounted to the adapter 200. When the rear 203 of the adapter 200 is inserted through an opening 305 (FIG. 2I) in a panel 300 (for example, see FIG. 2H), at least the first contact section 232 of the clip 230 passes through the opening 305 and engages a rear 301 of the panel 300. Accordingly, the panel 300 is held between the first contact section 232 of the clip 230 and the bulkhead flange 210 of the adapter 200.

Figure 2F:
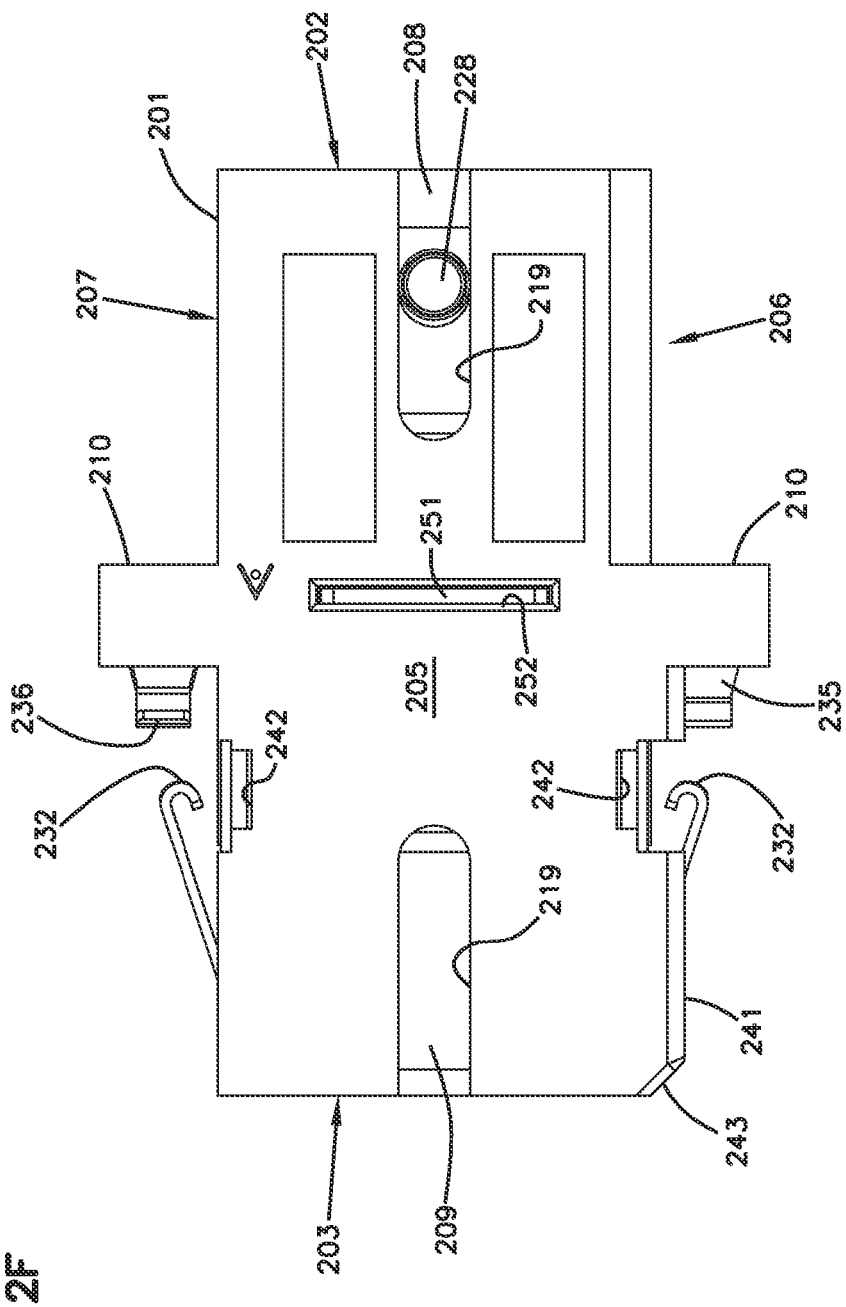
Figure 2G:
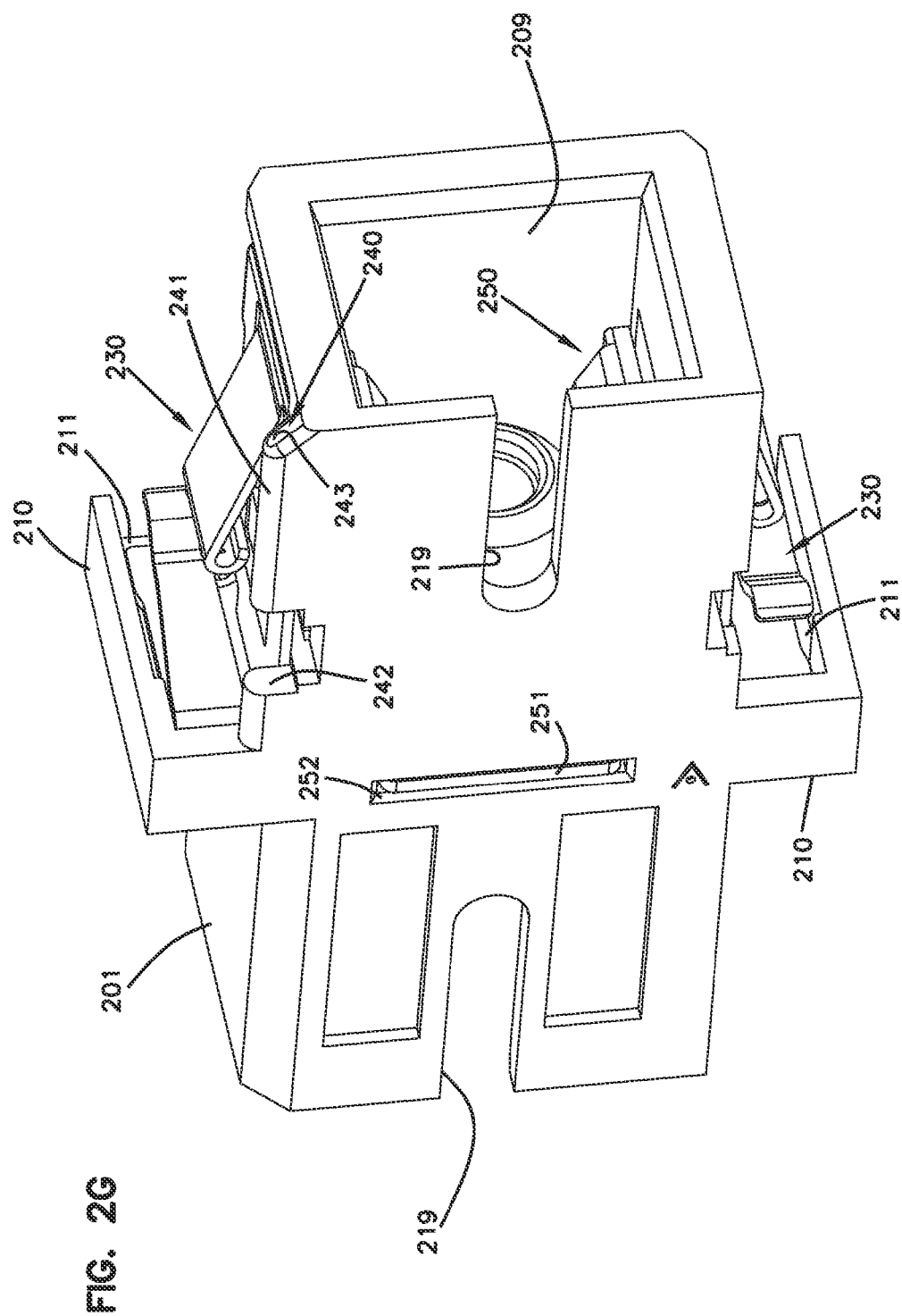
Figure 2H:
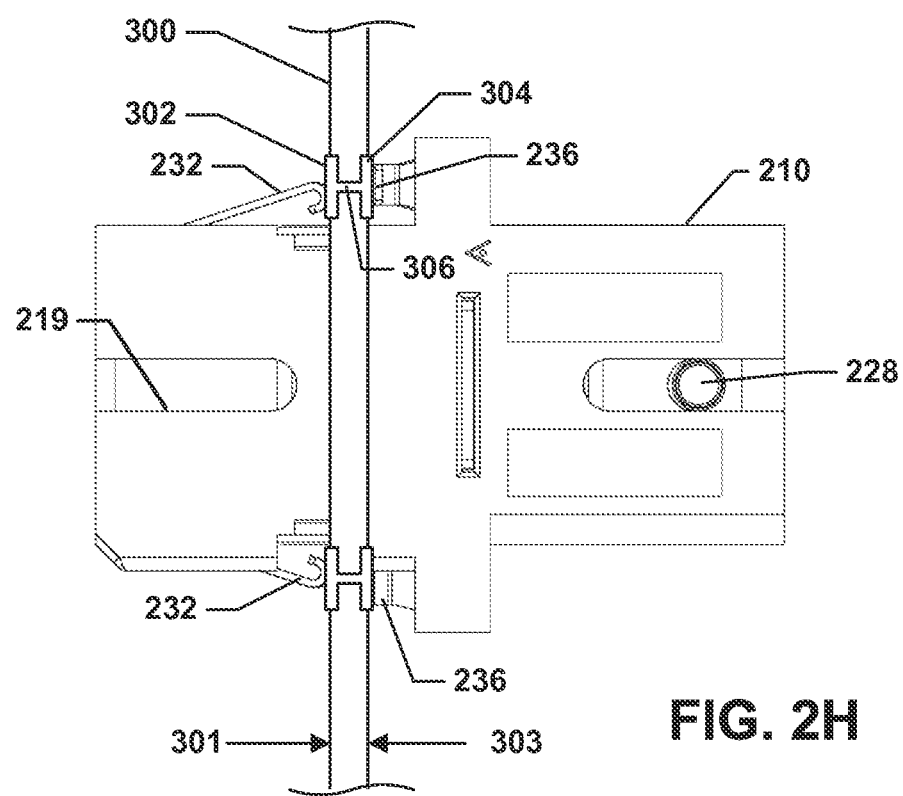
FIG. 2H shows a partial view of the optical adapter of FIG. 2A inserted into the panel shown in FIG. 2I.

In some implementations, the clip 230 also electrically connects the adapter 200 to circuitry mounted to the panel 300 (for example, see FIG. 2H). In such implementations, the clip 230 includes a second contact section 234. The second contact section 234 is configured to extend over one of the contact pads 224 of the circuit board 222. The second contact section 234 is electrically connected to the first contact section 232. For example, the clip body 231 can be formed of an electrically conductive material (for example, metal). The first contact section 232 can engage a contact pad 302 provided at a rear 301 of the panel 300 when the adapter 200 is mounted to the panel 300 (see FIG. 2H). Accordingly, the circuit board components of the adapter 200 can be electrically coupled to the panel circuitry.

In some implementations, the clip body 231 also includes a third contact section 236. The third contact section 236 extends towards the first contact section 232. When the adapter 200 is mounted at the panel 300, the third contact section 236 of the clip 230 is configured to engage a front 303 of the panel 300. For example, the third contact section 236 can engage a contact pad 304 provided at the front 303 of the panel 300 (see FIG. 2H). In certain implementations, the contact pad 304 at the front 303 of the panel 300 is electrically connected (for example, using a via 306) to the contact pad 302 at the rear 301 of the panel 300 (see FIG. 2H).

The combination of the second and third contacts 234, 236 increase the chance of some part of the clip body 231 touching one of the panel contact pads 302, 304 when a plug connector is being received at one of the plug openings 208, 209. For example, inserting a plug connector at the front plug opening 208 or removing a plug connector from the rear plug opening 209 can push the first contact section 232 of the clip 230 away from the rear contact pad 302 on the panel 300. In such situations, the third contact section 236 will be moved against the front contact pad 304 on the panel 300 and maintain the connection between the circuit board 222 and the panel circuitry. Likewise, inserting a plug connector at the rear plug opening 209 or removing a plug connector from the front plug opening 208 can push the third contact section 236 of the clip 230 away from the front contact pad 304 on the panel 300. In such situations, the first contact section 232 will be moved against the rear contact pad 302 on the panel 300 and maintain the connection between the circuit board 222 and the panel circuitry.

FIGS. 2C and 2D illustrate one example implementation of a clip 230 suitable for use in fastening the adapter body 201 to a panel or other surface. The clip body 231 of the example clip 230 includes a generally flat section. The first contact surface 232 is cut out from the flat section and bent outwardly. A distal end of the first contact section 232 is curved inwardly to provide a contoured engagement surface for the rear contact pad 302 of the panel 300. In other implementations, the distal end of the first contact section 232 can be bent or straight.

The second contact section 234 is disposed on a first cantilevered arm 233 extending outwardly from the flat section of the clip body 231. The cantilevered arm 233 is bent or curved so that the second contact section 234 extends generally orthogonal to the flat section of the clip body 231. Accordingly, the second contact section 234 is configured to lie over one of the major surfaces (for example, the first side 204) of the adapter body 201. A distal tip of the second contact section 234 can be contoured to facilitate contact with the contact pad 224 of the circuit board 222.

The third contact section 236 is disposed on a second cantilevered arm 235 extending outwardly from the flat section of the clip body 231. The second cantilevered arm 235 is bent or curved so that a portion of the third contact section 234 extends generally orthogonal to the flat section of the clip body 231 and to the second contact section 234. The third contact section 236 defines a resilient section so that the distal tip is moveable towards the second cantilevered arm 235 and away from the first contact section 232. In the example shown, the distal tip of the third contact section 236 defines a curve or bump protruding towards the first contact section 232.

The clip body 231 defines a retention flange 238 that facilitates mounting the clip body 231 to the adapter body 201. The retention flange 238 is disposed at an opposite side of the clip body 231 from the third contact section 236. The retention flange 238 contours away from the flat section of the clip body 231. The flat section of the clip body 231 defines a notched section 239 that extends along the second contact section 234.

Referring back to FIGS. 2A and 2B, the adapter body 201 is configured to receive one or more of the clips 230. For example, the ends 206, 207 of the adapter body 201 define recesses 212 in which the flat section of the clip body 231 seats. The end recesses 212 form ridges extending at least partially around the end recesses 212. For example, a ridge 215 can be formed along the second side 205 of the adapter body 201 and at an opposite end of the recess 212 from the bulkhead flange 210. The clip body 231 is disposed in one of the recesses 212 so that one side of the clip body 231 and the retention flange 238 abuts the ridge 215. The adapter body 201 includes a retention latch 214 that extends over and engages the notched section 239 of the clip body 231 opposite the ridge 215.

The adapter body 201 defines cutouts 213 in the first side 204 that connect the recesses 212 to the side recess 216. The first cantilevered arm 233 of each clip 230 extends through one of the cutouts 213 so that the second contact section 234 of the clip 230 can engage the contact pads 224 on the circuit board 222. In some implementations, the bulkhead flanges 210 define recessed sections 211 in which the third contact sections 236 of the clips 230 can seat. In other implementations, the third contact section 236 of each clip 230 can seat against an external surface of the respective bulkhead flange 210.

Referring to FIGS. 2E-2G, plug connectors can be keyed to mate with the adapter 200 at particular rotational orientation. For example, the adapter body 201 can define keyways 219 at the plug openings 208, 209 that are configured to mate with corresponding keys on the plug connectors when the plug connectors are received at the plug openings 208, 209. In the example shown, the keyways 219 are provided at an opposite side of the adapter body 201 from the circuit board 222. In the example shown, the second side 205 of the adapter body 201 defines the keyways 219. In certain implementations, the keyways 219 are provided at an opposite side of the adapter body 201 from the LED 228.

In accordance with some aspects of the disclosure, the adapter 200 also can include a keying arrangement 240 to mount the adapter 200 to the panel 300 in a particular rotational orientation. For example, in some implementations, the panel 300 can be configured to receive multiple adapters 200 with each adapter 200 keyed in particular rotational orientation. In certain implementations, the keyed orientation of some adapters 200 may differ from the keyed orientation of other adapters 200 relative to the panel 300. In other implementations, the adapters 200 can be keyed to the panel 300 so that the keyways 219 of the adapter bodies 201 all face in a common direction relative to the panel 300.

Figure 2I:
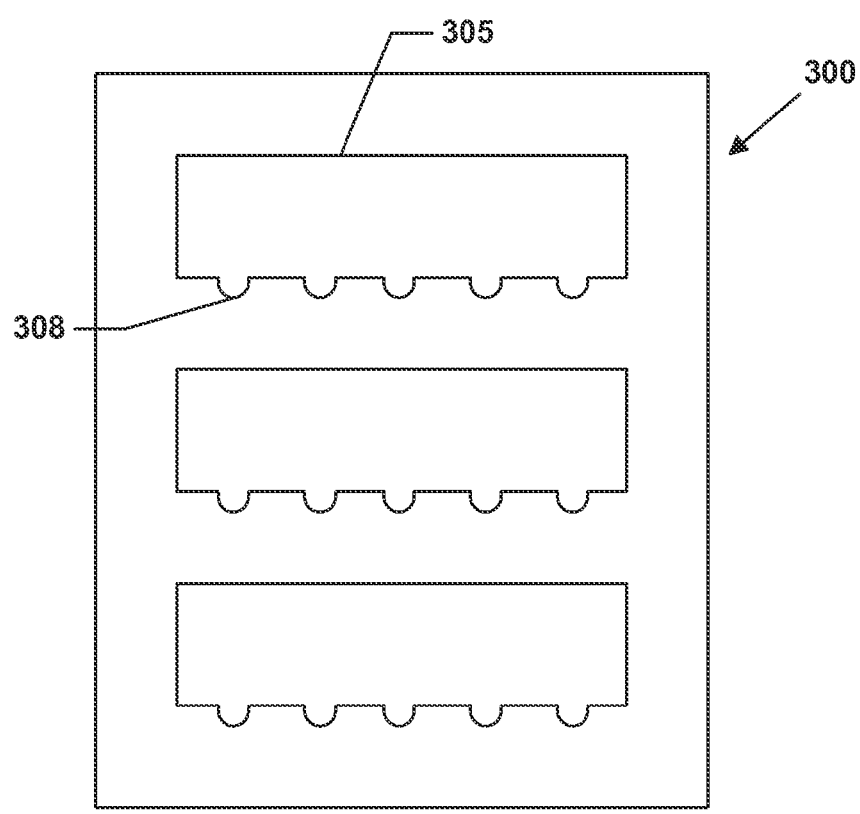
FIG. 2I shows an exemplary embodiment of a panel that is suitable for use with the optical adapter of FIG. 2A.

In the example shown in FIGS. 2E-2G, the keying arrangement 240 includes a rail 241 that is configured to slide within a notch 308 defined in the panel 300 (FIG. 2I). In some implementations, the panel 300 defines one or more openings 305 sized to receive multiple adapters 200. In such implementations, each opening 305 includes multiple notches 308. In other implementations, the panel 300 defines one or more openings 305 sized to receive a single adapter 200 each. In such implementations, each opening 305 defines one notch 308. In still other implementations, the panel 300 can define a bump protruding into the opening 305 and the adapter body 201 can define a channel along which the bump can slide when mounting the adapter 200 to the panel 300.

In some implementations, the rail 241 defines a ramped or tapered surface 243 that leads the key rail 241 into the panel notch 308 when the adapter 200 is mounted to the panel 300 (see FIG. 2G). The tapered surface 243 facilitates inserting the key rail 241 into the panel notch 308. In some implementations, the key rail 241 is formed to be planar with one of the sides 204, 205 of the adapter body 201. In certain implementations, the rail 241 extends planar with the second side 205 of the adapter body 201. In the example shown, the rail 241 extends out past the second end 207 of the adapter body 201. In certain implementations, the rail 241 has a contoured shaped. In certain implementations, the rail 241 defines a notch 242 that breaks the rail 241 into longitudinally spaced sections. In other implementations, the rail 241 can be provided at a different location on the adapter body 201.

These techniques can be applied to other types of devices (for example, other types of adapters and connectors, as wells as other similar devices, etc.).

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

EXAMPLE EMBODIMENTS

Example 1 includes an optical adapter comprising: a body in which at least one connector can be inserted; at least one radio frequency identification (RFID) antenna; a visual indicator; at least one adapter contact that is electrically connected to the RFID antenna and the visual indicator; and a clip configured to electrically connect the adapter contact to a panel contact on a panel when the optical adapter is inserted into the panel and to mechanically hold the optical adapter in the panel; wherein the RFID antenna is configured to be positioned near an RFID tag attached to the connector when the connector is inserted into the body of the optical adapter.

Example 2 includes the optical adapter of Example 1, wherein the RFID antenna comprises a pair of antenna coils implemented as a common loop. Example 3 includes the optical adapter of Example 2, wherein the pair of antenna coils is configured to read a first RFID tag attached to a first connector inserted into a first side of the optical adapter and to read a second RFID tag attached to a second connector inserted into a second side of the optical adapter. Example 4 includes the optical adapter of any of the Examples 1-3, wherein the visual indicator comprises a pair of light emitting diodes. Example 5 includes the optical adapter of any of the Examples 1-4, wherein the clip comprises a pair of clips. Example 6 includes the optical adapter of any of the Examples 1-5, further comprising a printed circuit board on which the RFID antenna, the visual indicator, and the adapter contact are mounted. Example 7 includes the optical adapter of any of the Examples 1-6, further comprising a light guide material, wherein the optical adapter is configured to optically couple the light guide material to the visual indicator so as to provide a visual indication at a point that is remote from the visual indicator.

Example 8 includes the optical adapter of any of the Examples 1-7, wherein the optical adapter is configured to be removable and re-insertable into the panel. Example 9 includes the optical adapter of any of the Examples 1-8, further comprising a keying arrangement configured to mount the optical adapter to the panel in a particular rotational orientation. Example 10 includes the optical adapter of Example 9, wherein the keying arrangement comprises a rail that is configured to slide within a notch included in the panel. Example 11 includes the optical adapter of any of the Examples 1-10, wherein optical adapter is keyed to mate with the connector at a particular rotational orientation. Example 12 includes the optical adapter of Example 11, wherein the body of the optical adapter defines a keyway in order to key the optical adapter to mate with the connector at the particular rotational orientation.

Example 13 includes the optical adapter of any of the Examples 1-12, wherein the clip comprises a plurality of contact sections, wherein each of the plurality of contact sections is configured to touch a corresponding contact on the panel in connection with at least one of: the connector being inserted into the optical adapter, the connector being removed from the optical adapter, and the optical adapter being inserted into the panel.

Example 14 includes a system comprising: a panel comprising a plurality of openings, each of the opening comprising a respective panel contact, wherein the system is configured to selectively couple each panel contact to an RFID reader; a plurality of optical adapters configured to be inserted into the openings of the panel, wherein each optical adapter comprises: a body in which at least one connector can be inserted; at least one radio frequency identification (RFID) antenna; a visual indicator; at least one adapter contact that is electrically connected to the RFID antenna and the visual indicator; and a clip configured to electrically connect the adapter contact to respective one of respective panel contacts when the optical adapter is inserted into one of the openings of the panel and to mechanically hold the optical adapter in the panel; wherein the RFID antenna of each connector is configured to be positioned near an RFID tag attached to the connector when the connector is inserted into the body of the optical adapter; and wherein the system is configured to selective couple the RFID reader to each of the panel contacts.

Example 15 includes the system of Example 14, wherein the system is configured to selectively couple each panel contact to a controller. Example 16 includes the system of any of the Examples 14-15, wherein the RFID antenna for each optical adapter comprises a pair of antenna coils implemented as a common loop. Example 17 includes the system of Example 16, wherein the pair of antenna coils for each optical adapter is configured to read a first RFID tag attached to a first connector inserted into a first side of the optical adapter and to read a second RFID tag attached to a second connector inserted into a second side of the optical adapter. Example 18 includes the system of any of the Examples 14-17, wherein the visual indicator for each optical adapter comprises a pair of light emitting diodes.

Example 19 includes the system of any of the Examples 14-18, wherein the clip for each optical adapter comprises a pair of clips. Example 20 includes the system of any of the Examples 14-19, wherein each optical adapter further comprises a printed circuit board on which the RFID antenna, the visual indicator, and the adapter contact for that optical adapter are mounted. Example 21 includes the system of any of the Examples 14-20, wherein each optical adapter further comprises a light guide material, wherein each optical adapter is configured to optically couple the light guide material to the visual indicator for that optical adapter so as to provide a visual indication at a point that is remote from the visual indicator.

Example 22 includes the system of any of the Examples 14-21, wherein each optical adapter is configured to be removable and re-insertable into the panel.

Example 23 includes the system of any of the Examples 14-22, wherein each optical adapter further comprises a keying arrangement configured to mount the optical adapter to the panel in a particular rotational orientation. Example 24 includes the system of Example 23, wherein the keying arrangement of each optical adapter comprises a rail that is configured to slide within a respective notch included in the panel. Example 25 includes the system of any of the Examples 14-24, wherein each optical adapter is keyed to mate with a corresponding connector at a particular rotational orientation. Example 26 includes the system of Example 25, wherein the body of each optical adapter defines a keyway in order to key the optical adapter to mate with the corresponding connector at the particular rotational orientation.

Example 27 includes the system of any of the Examples 14-26, wherein the clip of each optical adapter comprises a plurality of contact sections, wherein each of the plurality contact sections is configured to touch a corresponding contact on the panel in connection with at least one of: the corresponding connector being inserted into the optical adapter, the corresponding connector being removed from the optical adapter, and the optical adapter being inserted into the panel.

Example 28 includes a method comprising: inserting an optical adapter into an opening of a panel, wherein the optical adapter comprises: a body in which at least one connector can be inserted; at least one radio frequency identification (RFID) antenna; a visual indicator; at least one adapter contact that is electrically connected to the RFID antenna and the visual indicator; and a clip configured to electrically connect the adapter contact to a panel contact on a panel when the optical adapter is inserted into the panel and to mechanically hold the optical adapter in the panel; and wherein the RFID antenna is configured to be positioned near an RFID tag attached to the connector when the connector is inserted into the body of the optical adapter; selectively coupling an RFID reader to the RFID antenna; and reading a first RFID tag associated with a first connector inserted into a first side of the optical adapter and reading a second RFID tag associated with a second connector inserted into a second side of the optical adapter.

Example 29 includes the method of Example 28, further comprising: selectively coupling a controller to the visual indicator via the panel contact, the clip, and the adapter contact; and providing a visual indication at the optical adapter using the visual indicator under the control of the controller. Example 30 includes the method of any of the Examples 28-29, wherein the optical adapter further comprises a light guide material, wherein the optical adapter is configured to optically couple the light guide material to the visual indicator; and wherein providing a visual indication at the optical adapter comprises providing a visual indication at a point that is remote from the visual indicator. Example 31 includes the method of any of the Examples 28-30, further comprising keying the optical adapter so that the optical adapter will be mounted to the panel in a particular rotational orientation; wherein inserting the optical adapter into the opening of the panel comprises inserting the optical adapter into the opening of the panel so that the optical adapter is mounted to the panel in the particular rotational orientation.

Example 32 includes the method of any of the Examples 28-31, further comprising keying the optical adapter so that the optical adapter will mate with the connector at a particular rotational orientation. Example 33 includes the method of any of the Examples 28-32, wherein the clip comprises a plurality of contact sections, wherein each of the plurality of contact sections is configured to touch a corresponding contact on the panel in connection with at least one of: the corresponding connector being inserted into the optical adapter, the corresponding connector being removed from the optical adapter, and the optical adapter being inserted into the panel.

What is claimed is:

1. A system comprising:
 a panel comprising a plurality of openings, each of the opening comprising a respective panel contact, wherein the system is configured to selectively couple each panel contact to an RFID reader;
 a plurality of optical adapters configured to be inserted into the openings of the panel, wherein each optical adapter comprises:
 a body in which at least one connector can be inserted;
 at least one radio frequency identifier (RFID) antenna;
 at least one adapter contact that is electrically connected to the RFID antenna; and
 at least one conductor configured to electrically connect the adapter contact to respective one of respective panel contacts when the optical adapter is inserted into one of the openings of the panel;
 wherein the RFID antenna of each connector is configured to be positioned near an RFID tag attached to the connector when the connector is inserted into the body of the optical adapter; and
 wherein the system is configured to selectively couple the RFID reader to each of the panel contacts.

2. The system of claim 1, wherein the system is configured to selectively couple each panel contact to a controller.

3. The system of claim 1, wherein each optical adapter further comprises a visual indicator that is electrically connected to at least one adapter contact, wherein the visual indicator is electrically connected to at least one of: at least one adapter contact that is also electrically connected to the RFID antenna of that optical adapter; and at least one adapter contact that is not also electrically connected to the RFID antenna of that optical adapter.

4. The system of claim 3, wherein the visual indicator for each optical adapter comprises at least one light emitting diode.

5. The system of claim 3, wherein each optical adapter further comprises a printed circuit board on which the RFID antenna, the visual indicator, and the adapter contact for that optical adapter are mounted.

6. The system of claim 3, wherein each optical adapter further comprises a light guide material, wherein each optical adapter is configured to optically couple the light guide material to the visual indicator for that optical adapter so as to provide a visual indication at a point that is remote from the visual indicator.

7. The system of claim 1, wherein the RFID antenna for each optical adapter comprises a pair of antenna coils implemented as a common loop; and
wherein the pair of antenna coils for each optical adapter is configured to read a first RFID tag attached to a first connector inserted into a first side of the optical adapter and to read a second RFID tag attached to a second connector inserted into a second side of the optical adapter.

8. The system of claim 1, wherein the at least one conductor for each optical adapter is further configured to mechanically hold the optical adapter in the panel when the optical adapter is inserted into the panel.

9. The system of claim 1, wherein the at least one conductor for each optical adapter comprises a clip.

10. The system of claim 9, wherein the clip for each optical adapter comprises a pair of clips.

11. The system of claim 1, wherein each optical adapter is configured to be removable and re-insertable into the panel.

12. The system of claim 1, wherein the at least one conductor for each optical adapter comprises a plurality of contact sections, wherein each of the plurality of contact sections for that optical adapter is configured to touch a corresponding contact on the panel in connection with at least one of: the connector being inserted into that optical adapter, the connector being removed from that optical adapter, and that optical adapter being inserted into the panel.

13. The system of claim 1, wherein each optical adapter further comprises a keying arrangement configured to mount the optical adapter to the panel in a particular rotational orientation.

14. The system of claim 13, wherein the keying arrangement of each optical adapter comprises a rail that is configured to slide within a respective notch included in the panel.

15. The system of claim 1, wherein each optical adapter is keyed to mate with a corresponding connector at a particular rotational orientation.

16. The system of claim 15, wherein the body of each optical adapter defines a keyway in order to key the optical adapter to mate with the corresponding connector at the particular rotational orientation.

17. A method comprising:
inserting an optical adapter into an opening of a panel, wherein the optical adapter comprises:
a body in which at least one connector can be inserted;
at least one radio frequency identifier (RFID) antenna;
at least one adapter contact that is electrically connected to the RFID antenna; and
at least one conductor configured to electrically connect the adapter contact to a panel contact on a panel when the optical adapter is inserted into the panel; and
wherein the RFID antenna is configured to be positioned near an RFID tag attached to the connector when the connector is inserted into the body of the optical adapter;
selectively coupling an RFID reader to the RFID antenna; and
reading the RFID tag associated with the connecter inserted into the body of the optical adapter.

18. The method of claim 17, wherein the optical adapter further comprises a visual indicator that is electrically connected to at least one adapter contact of the optical adapter, wherein the visual indicator is electrically connected to at least one of: at least one adapter contact that is also electrically connected to the RFID antenna;
wherein the method further comprises:
selectively coupling a controller to the visual indicator via the adapter contact that is electrically connected to the visual indicator; and
providing a visual indication at the optical adapter using the visual indicator under the control of the controller.

19. The method of claim 18, wherein the optical adapter further comprises a light guide material, wherein the optical adapter is configured to optically couple the light guide material to the visual indicator; and
wherein providing a visual indication at the optical adapter comprises providing a visual indication at a point that is remote from the visual indicator.

20. The method of claim 17, wherein the at least one conductor is further configured to mechanically hold the optical adapter in the panel when the optical adapter is inserted into the panel.

21. The method of claim 17, wherein the RFID antenna comprises a pair of antenna coils implemented as a common loop; and
wherein reading the RFID tag associated with the connecter inserted into the body of the optical adapter comprising:
reading a first RFID tag attached to a first connector inserted into a first side of the optical adapter; and
reading a second RFID tag attached to a second connector inserted into a second side of the optical adapter.

22. The method of claim 17, further comprising keying the optical adapter so that the optical adapter will be mounted to the panel in a particular rotational orientation;
wherein inserting the optical adapter into the opening of the panel comprises inserting the optical adapter into the opening of the panel so that the optical adapter is mounted to the panel in the particular rotational orientation.

23. The method of claim 17, further comprising keying the optical adapter so that the optical adapter will mate with the connector at a particular rotational orientation.

24. The method of claim 17, wherein the at least one conductor comprises a plurality of contact sections, wherein each of the plurality of contact sections is configured to touch a corresponding contact on the panel in connection with at least one of: the corresponding connector being inserted into the optical adapter, the corresponding connector being removed from the optical adapter, and the optical adapter being inserted into the panel.

25. A first connector comprising:
a body configured to mate with a second connector attached to the end of a cable;
at least one radio frequency identifier (RFID) antenna;

at least one connector contact that is electrically connected to the RFID antenna; and at least one conductor configured to electrically connect the connector contact to a panel contact on a panel when the first connector is inserted into the panel;

wherein the RFID antenna is configured to be positioned near an RFID tag attached to the second connector when the second connector mates with the body of the first connector.

26. The first connector of claim 25, further comprising a visual indicator that is electrically connected to at least one connector contact, wherein the visual indicator is electrically connected to at least one of: at least one connector contact that is also electrically connected to the RFID antenna; and at least one connector contact that is not also electrically connected to the RFID antenna.

27. The first connector of claim 26, further comprising a printed circuit board on which the RFID antenna, the visual indicator, and the adapter contact are mounted.

28. The first connector of claim 26, further comprising a light guide material, wherein the first connector is configured to optically couple the light guide material to the visual indicator so as to provide a visual indication at a point that is remote from the visual indicator.

29. The first connector of claim 26, wherein the visual indicator for each optical adapter comprises at least one light emitting diode.

30. The first connector of claim 25, wherein the at least one conductor is further configured to mechanically hold the optical adapter in the panel when the first connector is inserted into the panel.

31. The first connector of claim 25, wherein the first connector comprises an optical adapter;

wherein the RFID antenna comprises a pair of antenna coils implemented as a common loop; and wherein the pair of antenna coils is configured to read a first RFID tag attached to a first cable connector inserted into a first side of the optical adapter and to read a second RFID tag attached to a second cable connector inserted into a second side of the optical adapter.

32. The first connector of claim 25, wherein the at least one conductor comprises a clip.

33. The first connector of claim 32, wherein the clip comprises a pair of clips.

34. The first connector of claim 25, wherein the first connector is configured to be removable and re-insertable into the panel.

35. The first connector of claim 25, wherein the at least one conductor comprises a plurality of contact sections, wherein each of the plurality of contact sections is configured to touch a corresponding contact on the panel in connection with at least one of: the second connector being mated with the body of the first connector, the second connector being unmated with the first connector, and the first connector being inserted into the panel.

36. The first connector of claim 25, further comprising a keying arrangement configured to mount the first connector to the panel in a particular rotational orientation.

37. The first connector of claim 36, wherein the keying arrangement comprises a rail that is configured to slide within a notch included in the panel.

38. The first connector of claim 25, wherein the first connector is keyed to mate with the second connector at a particular rotational orientation.

39. The first connector of claim 38, wherein the body of the first connector defines a keyway in order to key the first connector to mate with second the connector at the particular rotational orientation.

* * * * *